United States Patent
Wu (10) Patent No.: US 6,442,164 B1
(45) Date of Patent: Aug. 27, 2002

(54) METHOD AND SYSTEM FOR ALLOCATING BANDWIDTH AND BUFFER RESOURCES TO CONSTANT BIT RATE (CBR) TRAFFIC

(75) Inventor: Guoliang Wu, Plano, TX (US)

(73) Assignee: Fujitsu Network Communications, Inc., Richardson, TX (US)

( * ) Notice: Subject to any disclaimer, the term of this patent is extended or adjusted under 35 U.S.C. 154(b) by 0 days.

(21) Appl. No.: 09/325,695

(22) Filed: Jun. 3, 1999

(51) Int. Cl.[7] .......................... H04L 12/28; H04L 12/56

(52) U.S. Cl. ........................ 370/395.21; 370/395.41

(58) Field of Search .............................. 370/235, 230, 370/233, 232, 234, 252, 253, 395.21, 395.41, 395.43, 395.61, 231, 395.64, 395.65, 395.71, 412, 413, 415, 417, 428, 468

(56) References Cited

U.S. PATENT DOCUMENTS

| | | | |
|---|---|---|---|
| 4,339,633 A | 7/1982 | Ahmed | 179/99 M |
| 4,631,641 A | 12/1986 | Brombal et al. | 361/424 |
| 5,166,894 A | 11/1992 | Saito | 364/715.01 |
| 5,347,511 A | 9/1994 | Gun | 370/54 |
| 5,412,652 A | 5/1995 | Lu | 370/85.12 |
| 5,463,620 A | 10/1995 | Sriram | 370/60 |
| 5,467,348 A | 11/1995 | Fujii et al. | 370/60.1 |
| 5,583,857 A | * 12/1996 | Soumiya et al. | 370/233 |
| 5,838,686 A | * 11/1998 | Ozkan | 370/433 |
| 5,838,924 A | 11/1998 | Anderson et al. | 395/200.69 |
| 5,862,126 A | * 1/1999 | Shah et al. | 370/395.21 |
| 5,881,049 A | 3/1999 | Beshai et al. | 370/230 |
| 5,982,748 A | * 11/1999 | Yin et al. | 370/232 |
| 6,028,840 A | * 2/2000 | Worster | 370/230 |
| 6,185,210 B1 | 2/2001 | Troxel | 370/395 |

OTHER PUBLICATIONS

PCT Search Report in International Application No. PCT/US 00/15130, dated Aug. 21, 2000, 7 pages.

Hiroshi Saito, "Call Admission Control in an ATM Network Using Upper Bound of Cell Loss Probability," *IEEE Transactions on Communications*, vol. 40, No. 9, Sep., 1992, 10 pages.

Khosrow Sohraby, "On the Theory of General On–Off Sources With Applications in High–Speed Networks," *IEEE Infocom '93 Twelfth Annual Joint Conference of the IEEE Computer and Communications Societies*, Mar. 28, 1993, 11 pages.

Shim, et al., "Modeling and Call Admission Control Algorithm of Variable Bit Rate Video in ATM Networks," *IEEE Journal on Selected Areas in Communications*, vol. 12, No. 2, Feb., 1994, 13 pages.

McDysan, David E., et al., *ATM Theory and Application*. McGraw–Hill, Inc. ISBN 0–07–060362–6, pp. 365–385, 1994.

(List continued on next page.)

Primary Examiner—Douglas Olms
Assistant Examiner—Phirin Sam
(74) Attorney, Agent, or Firm—Baker Botts L.L.P.

(57) ABSTRACT

A method for allocating transmission resources to a constant rate connection includes determining a maximum cell clumping value for a constant rate connection based on a peak cell rate and a cell delay variation tolerance for the constant rate connection. An allocation bandwidth is determined for the constant rate connection based on the maximum cell clumping value. The allocation bandwidth comprises the bandwidth at which no cells of the constant rate connection are lost and the cell delay variation tolerance for the constant rate connection is satisfied. The allocation bandwidth is allocated at a network element for transmission of the constant rate connection.

17 Claims, 3 Drawing Sheets

OTHER PUBLICATIONS

Erdengiz, Ali, "ATM Usage Policing and Traffic Shaping," Communications System Design (Jan. 1997).

Dobrowski, George et al., ATM User–Network Interface Specification, Version 3.1, The ATM Forum, Sep., 1994.

Cerent 454™ High Speed SONET/SDH Transport System, ALTS trade show, Las Vegas, Nevada on or about Dec., 1998.

"FLM 150 ADM LAN Extension Product Design Specification," Revision 1.1, Internal Design Specification for Product, sheets 6/353–10/353 and 72/353–75/353, Product publicly released on or about Dec., 1998.

"Product Design Specification (PDS) for FLASH–192, Release 1, "Internal Design Specification for Product, pp. 1/916; 4–12/9161 315–320/916, Product publicly released on or about Mar., 1999.

"InterNetworking Systems; AnyMedia® Access Products; AnyMedia Access System," http://www.lucent.com/ins/products/anymedia.html, Printed Aug. 10, 2000.

"AnyMedia® Access System," Lucent Technologies, Inc. Marketing Communications, Sep., 1999.

"The AnyMedia™ Access System Anything's Possible," Lucent Technologies, Inc. Marketing Communications, 1997.

Photography of Northern Telecom Card, card dated Apr., 1998.

Held, G.,*Understanding Data Communications*, Fifth Edition, Sams Publishing. ISBN No. 0–672–30934–3, Chapter 14, pp. 419–431, 1996.

McCloghrie, K., et al., "Management Information Base for Network Management of TCP/IP–based internets: MIB–II," SNMP Working Group, Mar. 1991.

"Draft New Recommendation 1.630 (ATM Protection Switching)," ITU Telecommunication Standardization Sector, COM 13–41–E, Sep. 1998.

Guérin, R., et al., "Equivalent Capacity and its Application to Bandwidth Allocation in High–Speed Networks," IEEE Journal on Selected Areas in Communications, vol. 9, No. 7, pp. 968–981, Sep. 1991.

Gün, L., et al., "Bandwidth Management and Congestion Control Framework of the Broadband Network Architecture," Computer Networks and ISDN Systems 26, Elsevier Science Publishers B.V., North–Holland, pp. 61–78, 1993.

"S/DMS TransportNode 'OC–3 Express'—Cost–Effective SONET Transport for Low–Capacity Applications", Northern Telecom Marketing Publications, Issue 1, pp. 1–31, Sep. 27, 1996.

Universal Serial Bus Specification Revision 1.1, Compaq Computer Corporation, Intel Corporation, Microsoft Corporation, NEC Corporation, Sep. 23, 1998.

"MMC Products," http://www.mc-net.com/top-roducts/productdescriptions.html, Printed Jul. 22, 1999.

"MMC Network's Products: AnyFlow 5400," http://www.mmenet.com/Solutions/anyflow5400.asp, Printed Feb. 7, 2000.

"MMC Network's Products: AnyFlow 5500," http://www.mmcnet.com/Solutions/anyflow5500.asp., Printed Feb. 7, 2000.

"AnyFlow 5400 Product Overview," MMC Networks, Undated.

"AnyFlow 5500 Product Overview," MMC Networks, Undated.

SwitchStAR™ ATM Cell Based 8 X 8 Non–Blocking Single Chip Switching Memory, Preliminary IDT77V400, Commercial Temperature Range, Integrated Device Technology, Inc., pp. 1–23, May, 1998.

SwitchStAR™ ATM Cell Based 8 X 8 Non–Blocking Single Chip Switch Controller, Preliminary IDT77V500, Commercial Temperature Range, Integrated Device Technology, Inc., pp. 1–14, May, 1998.

Giroux, Natalie et al., Traffic Management Specification, Version 4.0, af–tm–0056.000, The ATM Forum, Apr., 1996.

M4 Interface Requirements and Logical MIB, af–nm–0020.000, The ATM Forum, Oct. 1994.

PCT International Search Report in International Application No. PCT/US 00/15341, dated Aug. 22, 2000, 6 pages.

* cited by examiner

METHOD AND SYSTEM FOR ALLOCATING BANDWIDTH AND BUFFER RESOURCES TO CONSTANT BIT RATE (CBR) TRAFFIC

TECHNICAL FIELD OF THE INVENTION

This invention relates generally to the field of telecommunications networks, and more particularly to a method and system for allocating bandwidth and buffer resources to constant bit rate (CBR) traffic in a telecommunications network.

BACKGROUND OF THE INVENTION

Telecommunications networks have traditionally been circuit-switch networks that have transmission paths dedicated to specific users for the duration of a call and that employ continuous, fixed-bandwidth transmission. Due to growth in data traffic created by the Internet and its related technologies, however, telecommunications networks are being moved to a packet-switching transmission model. Packet-switch networks provide a large range of digital services, from data to video to basic voice telephony. Packet-switch networks can allow dynamic bandwidth and may be connectionless with no dedicated path or connection-oriented with virtual circuits and dedicated bandwidth along a predetermined path.

Asynchronous transfer mode (ATM) is a connection-oriented packet-switching technology in which information is organized into small, fixed length cells. ATM carries data asynchronously, automatically assigning data cells to available time slots on demand to provide maximum throughput. Compared with other network technologies, ATM provides large increases in maximum supported bandwidth, designed-in asynchronous traffic support, support for multiple types of traffic such as data, video, and voice transmissions on shared communication lines, and virtual networking capabilities, which increase bandwidth utilization with high quality of service and ease network administration.

ATM cells are routed through a telecommunications network at high speeds using a switching label included in the cell. The switching label has two sections that define a virtual path (VP) and a virtual channel (VC) in the network through which the cell is routed. The use of virtual paths and virtual channels allows physical bandwidth in the network to be subdivided and separately commercialized.

Because of the low latency and predictability throughput ATM offers, it is capable of providing quality of service (QoS) features. QoS is defined in terms of the attributes of end-to-end ATM connections and is important in an integrated service network, particularly for delay-sensitive and/or loss sensitive applications such as audio and video transmissions, as well as voice-over IP. Other applications in which QoS may be important include traditional data communications, imaging, full-motion video, and multimedia, as well as voice.

Performance criteria for describing QoS for a particular connection include cell loss rate (CLR), cell transfer delay (CTD), and cell delay variation (CDV). ATM traffic is classified as either constant bit rate (CBR) traffic, real-time variable bit rate (rt-VBR) traffic, non real-time variable bit rate (nrt-VBR) traffic, available bit rate (ABR) traffic, and unspecified bit rate (UBR) traffic depending on the QoS parameters applied to the traffic. CBR and rt-VBR traffic visualize dedicated bandwidth and are intended for real time applications. ABR and nrt-VBR traffic is intended for non-real time applications which can control, on demand, their transmission rate in a certain range. Like ASR, UBR traffic is intended for non-real time applications which do not have any constraints on the cell delay and cell delay variations.

CBR traffic parameters include peak cell rate (PCR) and cell delay variation tolerance (CDVT) performance criteria which allows little or no cell loss, low cell delay, and low cell delay variation. Accordingly, traffic in a CBR connection arrives almost periodically with variations from the periodic rate at previous transmission stages causing cell clumping. To prevent cell loss in clumping conditions, additional bandwidth and buffer resources may need to be allocated.

Previous methods for allocating bandwidth and buffers to CBR connections have used various approximate queuing models, such as D/D/1 and N/D/1 which are not accurate and cannot insure QoS guaranties for some scenarios.

SUMMARY OF THE INVENTION

The present invention provides an improved method and system for allocating bandwidth and buffer resources to constant rate traffic that substantially eliminates or reduces disadvantages and problems associated with previous systems and methods. In particular, minimum bandwidth and buffer resources that are necessary to ensure constant rate connections achieve zero cell loss and guaranteed cell delay are allocated at a port or link.

In accordance with one embodiment of the present invention, a method for allocating transmission resources to a constant rate connection includes determining a maximum cell clumping value for a constant rate connection based on a peak cell rate and a cell delay variation tolerance for the constant rate connection. An allocation bandwidth is determined for the constant rate connection based on the maximum cell clumping value. The allocation bandwidth comprises the bandwidth at which no cells of the constant rate connection are lost and the cell delay variation tolerance for the constant rate connection is satisfied. The allocation bandwidth is allocated at a network element for transmission of the constant rate connection.

More particularly, in accordance with another aspect of the present invention, an allocation buffer size for the constant rate connection is determined based on the maximum cell clumping value in the allocation bandwidth. The allocation buffer size comprises a buffer size at which no cells are lost for the constant rate connection and the cell delay variation tolerance is satisfied. The allocation buffer size is allocated at the network element for transmission of the constant rate connection. The constant rate connection may comprise a constant bit rate (CBR) asynchronous transfer mode (ATM) or other suitable connection.

Technical advantages of the present invention include providing an improved method and system for allocation bandwidth and other suitable resources to CBR and other suitable traffic in a telecommunications network. In particular, bandwidth and buffer resources are allocated to a connection based on standardized traffic parameters for that connection. As a result, the allocated bandwidth and buffer size are accurate for all scenarios and parameter ranges. Service requirements are therefore completely guaranteed. In addition, the allocation methodology conforms to standardize traffic descriptors and can be efficiently implemented for real-time application in a network element.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

Figure 1:
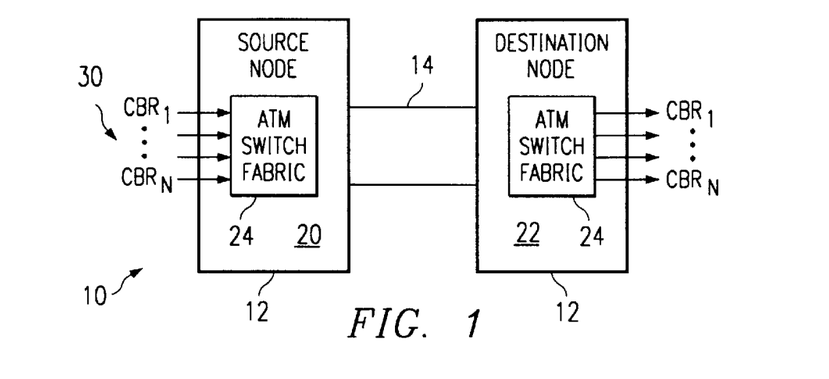
FIG. 1 is a block diagram illustrating a telecommunications network for transmitting constant bit rate (CBR) and other traffic in accordance with one embodiment of the invention.

FIG. 1 illustrates a telecommunications network 10 for transmitting asynchronous transfer mode (ATM) traffic in accordance with the one embodiment of the present invention. The telecommunications network 10 transmits voice, video, data, and other suitable types of information, and/or a combination of different types of information between remote locations. The telecommunications network 10 may be a public network such as the Internet, a private network such as an Intranet implemented on a local area network (LAN) or wide area network (WAN), or be suitably distributed across disparate networks.

Referring to FIG. 1, the telecommunications network 10 includes a plurality of nodes 12 interconnected by transmission line 14. The nodes 12 each comprise a network element (NE) capable of communicating traffic in the telecommunications network 10. The nodes 12 may be a switch, router, add/drop multiplexer or other suitable device capable of directing traffic in the telecommunications network 10.

The transmission line 14 provides a physical interface between the nodes 12. The physical interface is defined by the bandwidth of the connecting transmission line 14 which may be a DS-3 link, an OC-3 line, an OC-12 line or any other suitable type of line having similar or other bandwidths. The transmission line 14 may comprise optical fiber, cable, twisted wire, or other suitable wire line or wireless link capable of transporting traffic between two nodes 12.

For the embodiment of FIG. 1, the telecommunications network 10 includes a source node 20 and a destination node 22. The nodes 20 and 22 are each ATM elements or multi-protocol elements having functionality for processing ATM traffic in which information is organized into small, fixed length cells. The ATM cells are routed by the source and destination nodes 20 and 22 using a switching label included in the ATM cell. The switching label has two sections that define a virtual path (VP) and a virtual channel (VC) in the telecommunications network 10 through which the ATM cell is routed. Use of VPs and VCs allows physical bandwidth of the transmission line 14 to be subdivided into virtual constructs and separately commercialized.

The source and destination nodes 20 and 22 each include ATM switch fabric 24 that receives ATM traffic, performs address translation for switching labels in the traffic, and transmits the traffic in accordance with the translated switching labels. The ATM traffic comprises constant bit rate (CBR) traffic, real-time variable bit rate (rt-VBR) traffic, non real-time variable bit rate (nrt-VBR) traffic, available bit rate (ABR) traffic, and unspecified bit rate (UBR) traffic. The CBR traffic utilizes substantially constant bandwidth and is intended for real-time applications such as audio, video, and voice-over IP transmissions. The rt-VBR traffic is also used for real-time applications, but is bursty in nature with cells rates that change quickly and dramatically. ABR, UBR and nrt-VBR traffic are also bursty in nature. ABR traffic is intended for real-time applications which can control, on demand, their transmission rate in a certain range. The nrt-VBR and UBR traffic is intended for non real-time applications which do not have tight constraints on cell delay and cell delay variation.

Quality of service (QoS) levels are defined for each traffic type based on peak cell rate (PCR), cell loss rate (CLR), cell transfer delay (CTD), and cell delay variation tolerance (CDVT). For CBR and other types of constant rate traffic 30, the CDVT may be any type of suitable value based on tolerance within the stream to delay. A constant rate connection is a connection at least substantially characterized by a steady rate.

Figure 2:
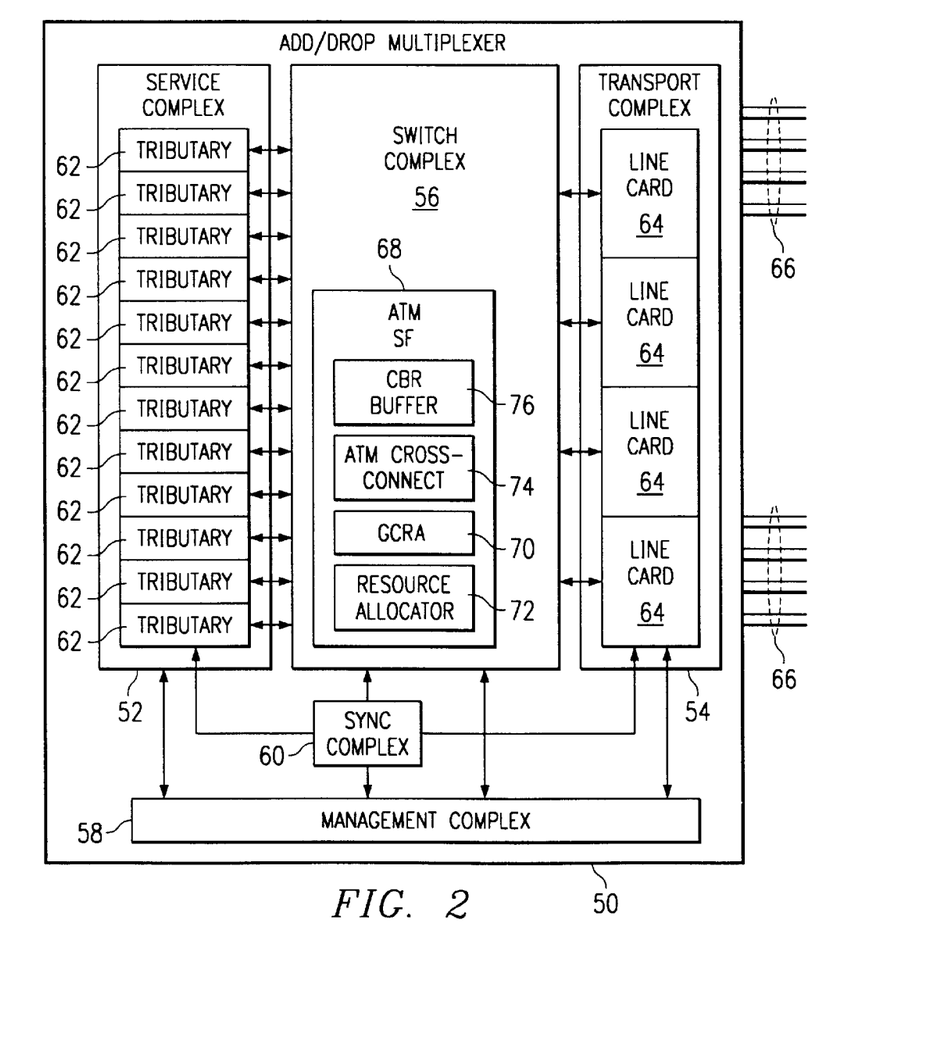
FIG. 2 is a block diagram illustrating an add/drop multiplexer element for the telecommunication system of FIG. 1 in accordance with one embodiment of the present invention.

FIG. 2 illustrates details of the source and destination nodes 20 and 22 in accordance with one embodiment of the present invention. In this embodiment, the nodes 20 and 22 are each a multi-protocol add/drop multiplexer 50. The add/drop multiplexer 50 includes a service complex 52, a transport complex 54, switch complex 56, a management complex 58, and a synchronization complex 60. The disparate complexes 52, 54, 56, 58, and 60 are interconnected by one or more networks or backplanes within the add/drop multiplexer 50.

Referring to FIG. 2, the service complex 52 includes a plurality of tributary cards 62. The tributary cards 62 each receive customer input/output (I/O) and perform conversions necessary for processing by the switch complex 56.

The transport complex 54 includes a plurality of line cards 64 for transmitting data on the transmission lines 66. In a particular embodiment, the line cards 64 are OC-3 or OC-12 line cards that are bi-directional and can handle optical to electrical (O/E) and electrical to optical (E/O) conversions. In this embodiment, the line cards 64 also handle the line and selection overhead extraction and insertion.

The switch complex 56 includes a plurality of switch fabrics including an ATM switch fabric 68. The ATM switch fabric 68 may include functionality outside the switch complex 56 and is implemented in part by software stored on a computer-readable medium for execution by a processor of the add/drop multiplexer 50. The computer-readable medium is a random access memory (RAM), a read only memory (ROM), or other suitable medium capable of storing programming instructions for execution by the processor.

The ATM switch fabric 68 includes a generic cell rate algorithm (GCRA) 70, resource allocator 72, ATM cross-connect 74, and a CBR buffer 76. The GCRA 70 monitors incoming ATM traffic for compliance with transmission contracts and terminates noncompliant ATM cells. The ATM resource allocator 72 is part of a connection admission control system within the add/drop multiplexer 50. As described in more detail below, the ATM resource allocator determines whether the node can accept additional ATM connections based on available bandwidth and buffer and allocates the resources in response to accepting a connection. The ATM allocator 82 allocates resources by itself performing the allocation functions or by initiating or approving allocation by another component in the ATM switch fabric 68, switch complex 56, or at/drop multiplexer 50. In particular, the resource allocator 72 determines whether sufficient bandwidth and buffer size is available for a port for supporting a requested CBR connection. If sufficient resources are available, the resource allocator 72 accepts a connection and allocates the required resources. If sufficient resources are not available, the resource allocator 72 declines a connection in order to prevent over-allocation of resources and resulting inability to meet QoS requirements.

The CBR buffer 76 is allocated to a CBR connection 30 for transmission of the connection which may include switching, routing, and the like. The CBR buffer 76 temporarily stores cells for the connection 30 while they are waiting to be transmitted. As described in more detail below, the CBR buffer 76 is sized to ensure that cells in the CBR connection 30 are not lost even in the event of maximum cell clumping. The CBR buffer 76 may be implemented as a logical construct in a shared memory to allow efficient resource utilization in the add/drop multiplexer 50.

The ATM switch fabric 68 receives ATM cells on an input port and switches them to an output port using the ATM cross-connect 74. In switching the ATM cells, the ATM switch fabric 68 first translates necessary VP and VC addresses in the switching label of the ATM cells.

The management complex 58 monitors and controls the status of the service, transport, switch, and synchronization complexes 52, 54, 56, and 60. The management complex 58 also maintains alarm, protection switching, and provisioning databases for the add/drop multiplexer 50. The synchronization complex 60 synchronizes the service, transport, and switch complexes 52, 54, and 56 by providing a stable traceable reference clock.

Figure 3:
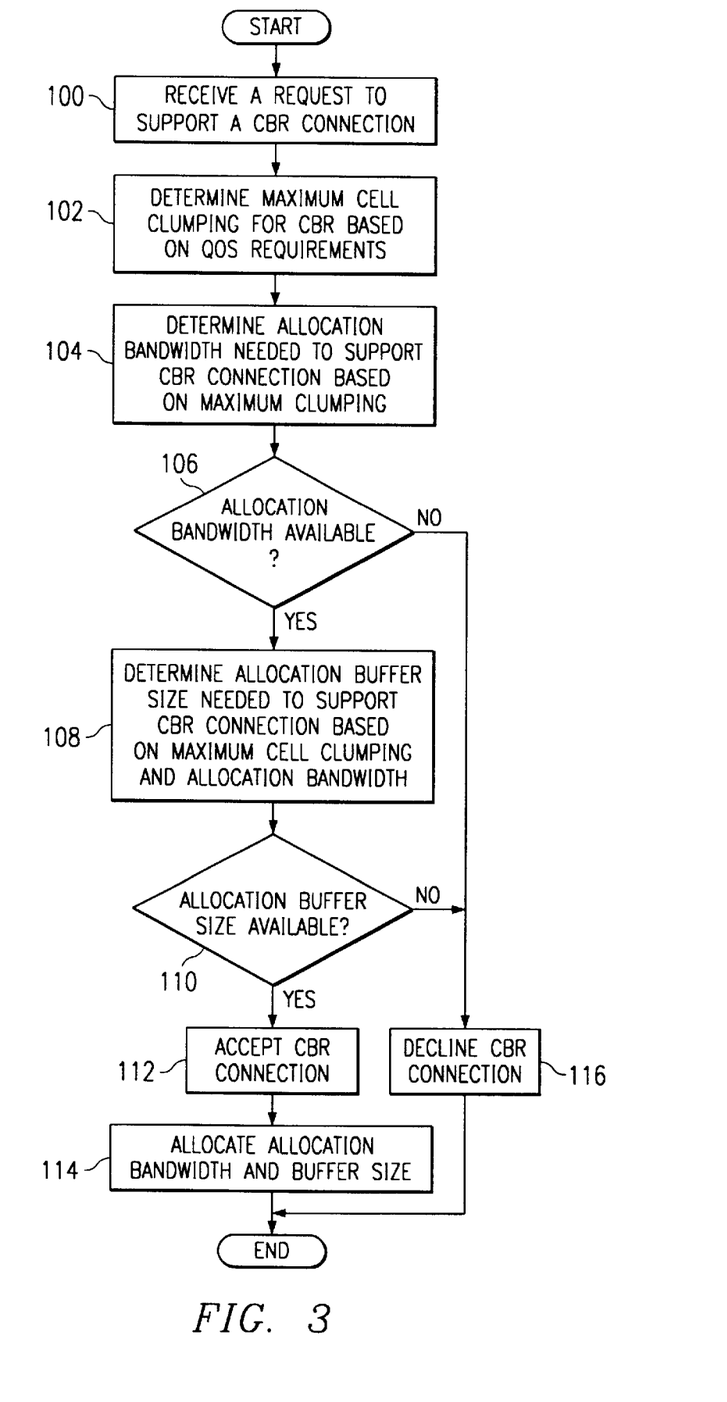
FIG. 3 is a flow diagram illustrating a method for determining and allocating bandwidth and buffer resources at a network element for CBR traffic in accordance with one embodiment of the present invention.

FIG. 3 is a flow diagram illustrating a method for determining and allocating resources in the add/drop multiplexer 50 to support a traffic connection in accordance with one embodiment of the present invention. In this embodiment, bandwidth and buffer size is determined and allocated by the resource allocator 72 for a CBR connection 30. It will be understood that other suitable types of resources may be allocated for substantially constant rate and other suitable connections using the methodology of the present invention.

Referring to FIG. 3, the method begins at step 100 in which the add/drop multiplexer 50 receives a request to support a CBR connection 30. The request includes the PCR and CDVT for the connection. At step 102, the resource allocator 72 determines a maximum cell clumping value for the CBR connection 30 based on the QoS requirements. In one embodiment, as described in more detail below, maximum cell clumping for the CBR connection is determined based on the PCR and CDVT for the connection as well as the rate of the transmission line on which the connection will arrive. The maximum cell clumping value may be the total number of conforming cells allowed to arrive back-to-back or within a defined period.

Next, at step 104, the resource allocator 72 determines an allocation bandwidth needed to support the CBR connection 30 based on the maximum cell clumping value for the connection 30. In one embodiment, as described in more detail below, the allocation bandwidth will be set to the PCR for the connection unless the maximum allowed cell queuing and delay determined from end-to-end delay requirements for the connection 30 is less than the CDVT. The maximum allowed cell queuing delay for a connection 30 is dependent on network topology for the links on which the connection is transmitted. In the latter case, additional bandwidth over the PCR will be allocated to ensure that no cells of the CBR connection 30 are lost even in the event of maximum cell clumping.

Proceeding to decisional step 106, the resource allocator 72 determines whether the allocation bandwidth is available at the add/drop multiplexer 50. If sufficient, bandwidth resources are available for supporting the requested CBR connection 30, it is next determined whether sufficient buffer size resources are available at the add/drop multiplexer 50 for the CBR connection 30. Accordingly, the Yes branch of decisional step 106 leads to step 108.

At step 108, a resource allocator 72 determines an allocation buffer size needed to support the CBR connection 30 based on the maximum cell clumping value and the allocation bandwidth. As used herein, based on means directly or indirectly using or derived from at least the identified parameters. Thus, additional parameters may also be used. In one embodiment, as described in more detail below, buffer size is determined at one or more instances of possible maximum cell delay in the CBR buffer 76 that will be allowed by the GCRA 70. In this embodiment, the maximum buffer size required in any of the instances is selected to ensure that no cells will be lost in that or any other scenario.

Proceeding to decisional step 110, the resource allocator 72 determines whether the allocation buffer size is available at the add/drop multiplexer 50. If the allocation buffer size is available, and having previously determined that the allocation bandwidth is available, the Yes branch of decisional step 110 leads to step 112 where the CBR connection 30 is accepted by the add/drop multiplexer 50. At step 114, the resource allocator 72 allocates the allocation bandwidth and buffer size in the add/drop multiplexer 50. The resource allocator 72 allocates resources by directly reserving those resources or initiating the reservation of those resources. Step 114 leads to the end of the process by which sufficient resources are determined to be available and are allocated to guarantee cell delay requirement and zero cell loss.

Returning to decisional step 106, if the allocation bandwidth needed to support the CBR connection 30 is not available at the add/drop multiplexer 50, the No branch of decisional step 106 leads to step 116 at which the CBR connection 30 is declined. Similarly, if the allocation buffer size is not available, the No branch of decisional step 110 also leads to step 116. Step 116 leads to the end of the process by which the add/drop multiplexer 50 declines CBR connections 30 for which it does not have adequate available resources to support the QoS requirements for the connections.

Figure 4:
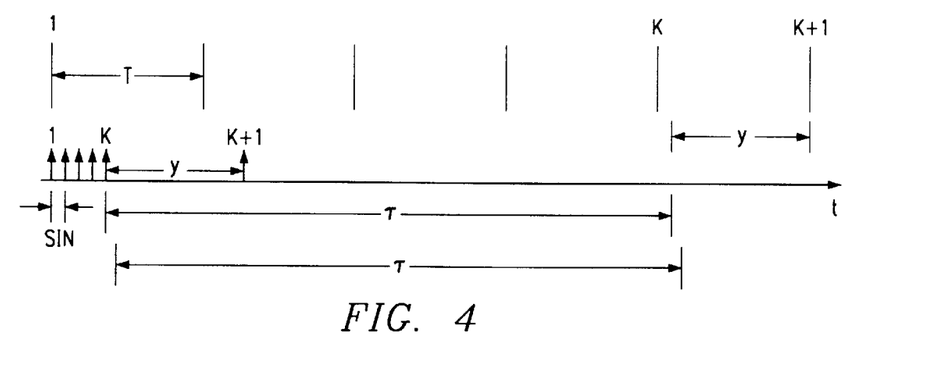
FIG. 4 is a chart diagram illustrating maximum cell clumping of a CBR connection at a network element of the telecommunications network of FIG. 1.

FIG. 4 illustrates maximum cell clumping for the CBR connection 30 at the add/drop multiplexer 50 in accordance with one embodiment. In this embodiment, the PCR and CDVT traffic descriptors of the CBR connection are used to determine maximum cell clumping. The ideal cell arrival rate, denoted by T, is the inverse of the PCR. The CDVT is denoted by $\tau$. The cell slot time for the ingress link on which the CBR connection 30 arrives is denoted $S_{in}$. Using K to denote the maximum number of back-to-back cell arrivals allowed by the GCRA 70 (1/PCR, CDVT) we obtained two inequalities:

$$(K-1) \cdot T - (K-1) \cdot S_{in} \leq \tau \tag{1}$$

$$K \cdot T - K \cdot S_{in} > \tau \tag{2}$$

From the two inequalities, we obtained:

$$\frac{\tau}{T - S_{in}} < K \leq \frac{\tau}{T - S_{in}} + 1 \quad (3)$$

Solving for the maximum cell clumping:

$$K = \left\lfloor \frac{\tau}{T - S_{in}} + 1 \right\rfloor \quad (4)$$

Accordingly, the maximum cell clumping is determined based on the PCR and CDVT service requirements for a CBR connection 30 along with the arrival of the ingress link. After a maximum cell clump 120, the next conforming cell 122 can arrive as early as a post-clump interval, denoted by y, that can be determined from maximum clumping using the following equation:

$$y = K \cdot T - ((K-1) \cdot S_{in}) - \tau \quad (5)$$

Figure 5:
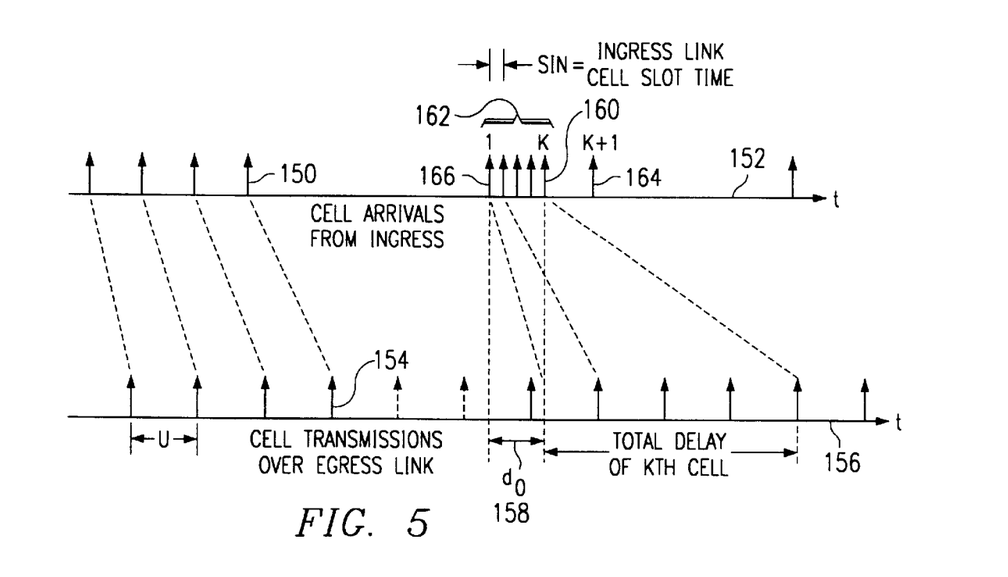
FIG. 5 is a chart diagram illustrating arrival and transmission processes for CBR traffic at a network element in the telecommunications network of FIG. 1.

FIG. 5 illustrates cell arrival and transmission processes for the CBR connection 30 in the add/drop multiplexer 50 in accordance with one embodiment. In this embodiment, cell arrival instances 150 are illustrated on an ingress time line 152 while cell transmission instances 154 are represented on a time line 156 for the egress link. The transmit instances each represent the time that a cell starts to transmit.

Referring to FIG. 5, the scheduling delay, denoted $d_o$, is a time between the arriving time of the first back-to-back cell until the cell starts to transmit. This is a random variable with a maximum scheduling delay assumed to be the transmission interval. The last cell 160, denote K, in the cell clump 162 or the next informing cell 164, denoted K+1, experiences the longest delay. With a first cell 166 in the cell clump 162 experiencing a schedule delay of $d_o$, the total delay for the last cell 160 in the cell clump 162 is $d_K + d_o$ and the total delay for the next conforming cell 164 is $d_{K-1} + d_o$, with $d_K$ and $d_{K-1}$ representing the delay caused by cell queuing due to clumping. The cell transmission interval, denoted U, is the inverse of the allocation bandwidth.

In the worst clumping case, the queuing delay of the last cell 160 in the cell clump 162 and the next conforming cell 164 are:

$$d_K = (K-1) \cdot U - (K-1) \cdot S_{in} \quad (6)$$

$$d_{K-1} = K \cdot U - K \cdot T + \tau \quad (7)$$

The allocation bandwidth to support the CBR connection 30 with zero cell loss and the required queuing delay should result in the delay for the last cell 160 in the cell clump 162 and the next conforming cell 164 each being less than or equal too the maximum allowed cell queuing delay, denoted D, derived from the end-to-end delay requirement for the connection 30. Thus, the queuing delay for the last cell 160 of the cell clump 162 and the next conforming cell 164 should each be less than or equal too the maximum allowed cell queuing delay for the connection 30, which can be expressed as follows:

$$d_K \leq D \text{ and } d_{K-1} \leq D \quad (8)$$

Substituting the maximum cell clumping and the cell transmission interval into the two inequalities, we obtained the following two bandwidth values which the allocation bandwidth must satisfy:

$$R_1 = \frac{\tau}{D \cdot (T - S_{in}) + \tau \cdot S_{in}} \text{ for } d_k \leq D \quad (9)$$

$$R_2 = \frac{\tau + T - S_{in}}{(D + T) \cdot (T - S_{in}) + \tau \cdot S_{in}} \text{ for } d_{K+1} \leq D \quad (10)$$

When the maximum allowed cell clumping is less than the CDVT for the CBR connection, the bandwidth necessary to support delay caused by the last cell 160 in the cell clump 162 will be greater than that to support the next conforming cell 164. Conversely, when the maximum allowed cell queuing delay is greater than the CDVT, the bandwidth necessary to support the cell delay of the next conforming cell 164 is greater than that to support the last cell 160 in the cell clump 162 and equal to the PCR for the CBR connection 30. When the maximum allowed cell queuing delay is equal to CDVT, the bandwidth necessary to support cell delay of the last cell 160 in cell clump 162 and the next conforming cell 164 are equal to each other and to the PCR. In addition to supporting the delay requirement, the allocation bandwidth must not be less than the PCR. Otherwise, the queuing system will not be stable. Therefore, the allocation bandwidth, denoted as $R_0$, may be determined from the following equation:

$$R_0 = \max\{R_1, R_2, PCR\} = \begin{cases} PCR & (D \geq \tau) \\ \dfrac{\tau}{D \cdot (T - S_{in}) + \tau \cdot S_{in}} & (D < \tau) \end{cases} \quad (11)$$

Thus, when the maximum allowed cell queuing delay (D) is greater than or equal to the CDVT ($\tau$), the allocation bandwidth ($R_0$) is equal to the PCR for the CBR connection 30. That is, for such local queuing delay requirement, the allocation bandwidth is always PCR and the delay requirement is satisfied. When the maximum allowed cell queuing delay (D) is less than the CDVT ($\tau$), the allocation bandwidth ($R_0$) is larger than the PCR for the CBR connection 30. This increase bandwidth is limited by:

$$R_0 \leq \frac{\tau}{D} \cdot PCR \quad (12)$$

This upper bound may be used as a simplified method for determining the allocation bandwidth. Accordingly, computational efficiency and processing within the resource allocator 72 is improved. If the maximum allowed cell queuing delay (D) is not much smaller than the CDVT ($\tau$), the upper bound provides a good approximation for the actual allocation bandwidth needed to support the CBR connection 30. Use of a simplified process will result in a slight over-allocation in some circumstances but will always insure the guaranteed cell delay requirement.

After the allocation bandwidth has been determined, allocation buffer size which in at least some circumstances is dependent on the allocation bandwidth can then be determined. To achieve zero cell loss, the buffer is sized large enough to accommodate all cells when the maximum cell clumping occurs. With the scheduling delay less than or equal to the cell transmission interval, the maximum queue length occurs at the arrival instance of the last cell 160 in the cell clump 162 or the arrival instance of the next conforming cell 164. According, the queue length immediately after (before next transmission) the arrival of the last cell 160 in the cell clump 162 and the next conforming cell 164 are each determined from the following equations:

$$q_K = K - \left\lfloor \frac{(K-1) \cdot S_{in} - d_0}{U} \right\rfloor - 1 \quad (13)$$

$$q_{K+1} = K - \left\lfloor \frac{K \cdot T - \tau - d_0}{U} \right\rfloor - 1 \quad (14)$$

When the scheduling delay is equal to the cell transmission interval, which is the worst case scenario, the queue length for each of the cells 160 and 164 is:

$$q_K = K - \left\lfloor \frac{(K-1) \cdot S_{in}}{U} \right\rfloor \quad (15)$$

$$q_{K+1} = K + 1 - \left\lfloor \frac{K \cdot T - \tau}{U} \right\rfloor \quad (16)$$

Accordingly, the CBR buffer size, denoted B, is determined by:

$$B \approx \max(q_K, q_{K-1}) \quad (17)$$

In this way, the CBR buffer 76 can fully support maximum clumping and no cells from the CBR connection 30 will be lost.

Although the present invention has been described with several embodiments, various changes and modifications may be suggested to one skilled in the art. It is intended that the present invention encompass such changes and modifications as fall within the scope of the appended claims.

What is claimed is:

1. A method for allocating transmission resources to a constant rate connection, comprising:
   determining a maximum cell clumping value for a constant rate connection based on a peak cell rate and a cell delay variation tolerance for the constant rate connection;
   determining an allocation bandwidth for the constant rate connection based on the maximum cell clumping value, the allocation bandwidth comprising a bandwidth at which no cells of the constant rate connection are lost and the cell delay variation tolerance for the constant rate connection is satisfied; and wherein the determining the allocation bandwidth for the constant rate connection comprises:
   determining a maximum allowed cell queuing delay based on an end-to-end delay requirement for the constant rate connection;
   comparing the maximum allowed cell queuing delay to the cell delay variation tolerance;
   determining the allocation bandwidth to be the peak cell rate in response to the maximum allowed cell queuing delay being greater than or equal to the cell delay variation tolerance; and
   determining the allocation bandwidth to be greater than the peak cell rate in response to the maximum allowed cell queuing delay being less than the cell delay variation tolerance; and
   allocating the allocation bandwidth at a network element for transmission of the constant rate connection.

2. The method of claim 1, further comprising determining the allocation bandwidth for the constant rate connection based on a ratio of the cell delay variation tolerance to the maximum allowed cell queuing delay in response to determining the cell delay variation tolerance is greater than the maximum allowed cell queuing delay.

3. The method of claim 2, wherein the allocation bandwidth is a product of the ratio and the peak cell rate.

4. The method of claim 1, wherein the allocation bandwidth comprises at least the peak cell rate for the constant rate connection.

5. The method of claim 4, further comprising allocating the allocation bandwidth and the allocation buffer size from available resources at the network element in response to accepting the constant rate connection.

6. The method of claim 1, further comprising:
   determining an allocation buffer size for the constant rate connection based on the maximum cell clumping value and the allocation bandwidth, the allocation buffer size comprising a buffer size at which no cells are lost for the constant rate connection and the cell delay variation tolerance is satisfied; and
   allocating the allocation buffer size at the network element for transmission of the constant rate connection.

7. The method of claim 1, wherein the constant rate connection comprises a constant bit rate asynchronous transfer mode connection.

8. A method for allocating transmission resources to a constant rate connection, comprising:
   determining a maximum cell clumping value for a constant rate connection based on a peak cell rate and a cell delay variation tolerance for the constant rate connection;
   determining an allocation bandwidth for the constant rate connection based on the maximum cell clumping value, the allocation bandwidth comprising a bandwidth at which no cells of the constant rate connection are lost and the cell delay variation tolerance for the constant rate connection is satisfied;
   allocating the allocation bandwidth at a network element for transmission of the constant rate connection;
   determining an allocation buffer size for the constant rate connection based on the maximum cell clumping value and the allocation bandwidth, the allocation buffer size comprising a buffer size at which no cells are lost for the constant rate connection and the cell delay variation tolerance is satisfied, wherein the determining the allocation buffer size comprises:
   determining a first buffer size needed to store cells for the constant rate connection immediately after a maximum cell clump of back-to-back cells;
   determining a second buffer size needed to store cells of the constant rate connection immediately after the arrival of a next conforming cell following the maximum cell clump; and
   selecting the larger of the first and second buffer size as the allocation buffer size; and
   allocating the allocation buffer size at the network element for transmission of the constant rate connection.

9. A method for determining whether a constant rate connection can be accepted by a network element in a telecommunications network, comprising:
   receiving a request for supporting a constant rate connection, the request including a peak cell rate and a cell delay variation tolerance for the constant rate connection;
   determining a maximum cell clumping value for the constant rate connection based on the peak cell rate and the cell delay variation tolerance for the constant rate connection;
   determining an allocation bandwidth for the constant rate connection based on the maximum cell clumping value, the allocation bandwidth comprising a bandwidth at which no cells of the constant rate connection are lost and the cell delay variation tolerance is satisfied, and wherein determining the allocation bandwidth for the constant rate connection comprises:

determining a maximum allowed cell queuing delay based on an end-to-end delay requirement for the constant rate connection;

comparing the maximum allowed cell queuing delay to the cell delay variation tolerance;

determining the allocation bandwidth to be the peak cell rate in response to the maximum allowed cell queuing delay being greater than or equal to the cell delay variation tolerance; and     determining the allocation bandwidth to be greater than the peak cell rate in response to the maximum allowed cell queuing delay being less than the cell delay variation tolerance; and declining the constant rate connection in response to determining the allocation bandwidth is greater than available bandwidth at the network element.

10. The method of claim 9, further comprising determining the allocation bandwidth for the constant rate connection based on a ratio of the cell delay variation tolerance to the maximum allowed cell queuing delay in response to determining the cell delay variation tolerance is greater than the maximum allowed cell queuing delay.

11. The method of claim 10, wherein the allocation bandwidth is a product of the ratio and the peak cell rate.

12. The method of claim 9, further comprising:

determining an allocation buffer size for the constant rate connection based on the maximum cell clumping value and the allocation bandwidth, the allocation buffer size comprising a buffer size at which no cells of the constant rate connection are lost and the cell delay variation tolerance is satisfied; and     declining the constant rate connection in response to determining the allocation buffer size is greater than available buffer size at the network element.

13. The method of claim 12, further comprising accepting the constant rate connection in response to determining the allocation bandwidth is less than available bandwidth resources and the allocation buffer size is less than available buffer resources.

14. The method of claim 9, wherein the constant rate connection comprises a constant bit rate connection for asynchronous transfer mode traffic.

15. A method of claim 9, wherein the allocation bandwidth comprises at least the peak cell rate for the constant rate connection.

16. A method for allocating transmission resources to traffic at a network element, comprising:

determining a maximum cell clumping value for a constant rate connection based on a peak cell rate and a cell delay variation tolerance for the constant rate connection;

determining an allocation buffer size for the constant rate connection based on the maximum cell clumping value, the allocation buffer size comprising a buffer size at which no cells of the constant rate connection are lost and the cell delay variation tolerance is satisfied, and wherein determining the allocation buffer size further comprises:

determining a first buffer size needed to store cells for the constant rate connection immediately after a maximum cell clump of back-to-back cells;

determining a second buffer size needed to store cells of the constant rate connection immediately after the arrival of a next conforming cell following the maximum cell clump; and         selecting the larger of the first and second buffer size as the allocation buffer size; and     allocating the allocation buffer size at a network element to the constant rate connection.

17. The method of claim 16, wherein the constant rate connection comprises a constant bit rate asynchronous transfer mode connection.

\* \* \* \* \*

UNITED STATES PATENT AND TRADEMARK OFFICE
CERTIFICATE OF CORRECTION

PATENT NO. : 6,442,164 B1
DATED : August 27, 2002
INVENTOR(S) : Guoliang Wu

It is certified that error appears in the above-identified patent and that said Letters Patent is hereby corrected as shown below:

<u>Title page,</u>
Item [56], OTHER PUBLICATIONS, after "MMC Network's Products: AnyFlow 5400," delete "http://www.mmenet.com" and insert -- www.mmcnet.com --.

<u>Column 7,</u>
Line 33, after "160", delete "denote" and insert -- denoted --.
Line 38, after "is", delete "$d_{k-1}$" and insert -- $d_{k+1}$ --.
Line 39, after "and", delete "$d_{k-1}$" and insert -- $d_{k+1}$ --.
Line 48, equation (7), delete "$d_{k-1}$" and insert -- $d_{k+1}$ --.
Line 53, after "equal", delete "too" and insert -- to --.
Line 58, after "equal", delete "too" and insert -- to --.
Line 62, equation (8), delete "$d_{k-1}$" and insert -- $d_{k+1}$ --.

<u>Column 8,</u>
Line 66, after "164.", delete "According" and insert -- Accordingly --.

<u>Column 9,</u>
Line 23, equation (17), after "B ≈ max", delete ($q_K,q_{K-1}$) and insert -- ($q_K,q_{K+1}$) --.

<u>Column 10,</u>
Line 42, after "wherein", delete "the".

Signed and Sealed this

Twenty-seventh Day of May, 2003

JAMES E. ROGAN
*Director of the United States Patent and Trademark Office*